(12) United States Patent
Naroditsky et al.

(10) Patent No.: US 11,740,321 B2
(45) Date of Patent: Aug. 29, 2023

(54) VISUAL INERTIAL ODOMETRY HEALTH FITTING

(71) Applicant: Apple Inc., Cupertino, CA (US)

(72) Inventors: Oleg Naroditsky, San Francisco, CA (US); Kuen-Han Lin, Mountain View, CA (US); Dimitrios Kottas, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1502 days.

(21) Appl. No.: 15/926,557

(22) Filed: Mar. 20, 2018

(65) Prior Publication Data
US 2019/0164040 A1 May 30, 2019

(30) Foreign Application Priority Data

Nov. 30, 2017 (GR) .............................. 20170100543

(51) Int. Cl.
*G01S 5/16* (2006.01)
*G06T 7/246* (2017.01)
*G01S 19/47* (2010.01)
*G06F 18/21* (2023.01)
*G06F 18/2413* (2023.01)
*G06N 3/042* (2023.01)
*G06V 10/764* (2022.01)
*G01S 19/52* (2010.01)

(52) U.S. Cl.
CPC ................ *G01S 5/16* (2013.01); *G01S 19/47* (2013.01); *G06F 18/217* (2023.01); *G06F 18/24133* (2023.01); *G06N 3/042* (2023.01); *G06T 7/251* (2017.01); *G06V 10/764* (2022.01); *G01S 19/52* (2013.01); *G06F 2218/12* (2023.01); *G06V 2201/03* (2022.01)

(58) Field of Classification Search
CPC ....... G06N 3/0427; G06T 7/251; G01S 19/47; G01S 19/52; G06K 9/6262
See application file for complete search history.

(56) References Cited

U.S. PATENT DOCUMENTS

| 5,224,179 A | * | 6/1993 | Denker | ................ G06V 30/168 |
| | | | | 382/259 |
| 6,591,004 B1 | * | 7/2003 | VanEssen | ............... G06T 17/00 |
| | | | | 378/4 |

(Continued)

FOREIGN PATENT DOCUMENTS

| EP | 2458406 A1 | * | 5/2012 | ............. G01S 19/22 |
| WO | WO-2022093283 A1 | * | 5/2022 | |

*Primary Examiner* — Xuan M Thai
*Assistant Examiner* — Sadaruz Zaman
(74) *Attorney, Agent, or Firm* — Blank Rome LLP (57) ABSTRACT

Systems, methods, and computer readable media to track and estimate the accuracy of a visual inertial odometry (VIO) system. Various embodiments are able to receive one or more VIO feature measurements associated with a set of image frames from a VIO system and generate a plurality of feature models to estimate health values for the VIO system. The various embodiments determine a plurality of feature health values with the feature models based on the VIO feature measurements and compare the feature health values with ground truth health scores associated with the set of image frames to determine one or more errors. The feature model parameters are updated based on the comparison with the feature health values with ground truth health scores.

20 Claims, 6 Drawing Sheets

(56) References Cited

U.S. PATENT DOCUMENTS

| | | | |
|---|---|---|---|
| 7,130,484 B2 * | 10/2006 | August | G06T 5/003 348/533 |
| 8,031,919 B2 * | 10/2011 | Eskildsen | G06T 7/12 382/128 |
| 8,098,068 B2 * | 1/2012 | Yanasak | G01R 33/56341 324/309 |
| 8,170,305 B2 * | 5/2012 | Laidlaw | G01R 33/56341 324/309 |
| 8,717,233 B2 * | 5/2014 | Ashjaee | G01S 19/35 342/357.25 |
| 9,405,972 B2 * | 8/2016 | Moeglein | G01C 21/165 |
| 9,495,756 B2 * | 11/2016 | Rivet-Sabourin | G06T 3/4053 |
| 9,501,839 B1 * | 11/2016 | Korchev | G06T 5/002 |
| 9,514,539 B2 * | 12/2016 | Rivet-Sabourin | G06T 7/12 |
| 9,607,241 B2 * | 3/2017 | Rivet-Sabourin | G06T 7/12 |
| 10,242,501 B1 * | 3/2019 | Pusch | G06F 3/016 |
| 10,303,986 B2 * | 5/2019 | Najarian | G06T 7/68 |
| 10,453,187 B2 * | 10/2019 | Peterson | G06T 5/20 |
| 10,521,883 B1 * | 12/2019 | Hayes | G06T 5/10 |
| 10,682,108 B1 * | 6/2020 | Ma | G06T 7/20 |
| 10,977,798 B2 * | 4/2021 | Kc | G06T 7/13 |
| 11,188,787 B1 * | 11/2021 | Ulbricht | G06K 9/6271 |
| 2003/0215779 A1 * | 11/2003 | Dupont | G09B 7/00 434/350 |
| 2013/0250122 A1 * | 9/2013 | Binder | H04L 5/14 348/162 |
| 2015/0205299 A1 * | 7/2015 | Schnittman | G05D 1/0227 901/1 |
| 2016/0077547 A1 * | 3/2016 | Aimone | A61B 5/6814 345/8 |
| 2016/0305784 A1 * | 10/2016 | Roumeliotis | G06K 9/6267 |
| 2017/0031032 A1 * | 2/2017 | Garin | G01S 19/48 |
| 2017/0148214 A1 * | 5/2017 | Muniz-Simas | A61B 5/165 |
| 2017/0227656 A1 * | 8/2017 | Niesen | G01S 19/393 |
| 2017/0364832 A1 * | 12/2017 | Habermehl | H04L 51/26 |
| 2019/0066328 A1 * | 2/2019 | Kwant | G06T 7/75 |
| 2019/0079536 A1 * | 3/2019 | Zhu | G06T 7/269 |
| 2019/0164040 A1 * | 5/2019 | Naroditsky | G06T 7/251 |
| 2019/0199759 A1 * | 6/2019 | Anderson | H04L 67/306 |
| 2019/0244427 A1 * | 8/2019 | Sun | G06F 3/011 |
| 2019/0365286 A1 * | 12/2019 | Powers, III | A61B 5/6828 |

* cited by examiner

VISUAL INERTIAL ODOMETRY HEALTH FITTING

BACKGROUND

This disclosure relates generally to mapping and tracking of location information with a machine learning computing system. More particularly, but not by way of limitation, this disclosure relates to implementing machine learning operations that monitor the health of a visual inertial odometry (VIO) system, such as a Simultaneous Localization and Mapping (SLAM) system.

Computer vision methods often involve having a computing system extract and analyze digital images from a real environment to understand real world contexts and form decisions based on these contexts. SLAM technology, in particular, involves automatically determining the position and/or orientation of a device relative to a real environment and creating a scaled geometrical model of the real environment without requiring pre-knowledge of the environment. The creation of the scaled geometrical model of the real environment can also be referred to as reconstruction of the environment. The use of SLAM technology is pertinent to many applications, such as navigation of a robot system or a mobile system, 3D reconstruction, camera pose estimation and supporting Augmented Reality (AR) applications in an unknown real environment.

SLAM technology can utilize one or more cameras and one or more inertial measurement units (IMUs) to track and update a map for an unknown real environment. The cameras are able to capture images of the real environment and the IMUs are able to capture measurements relating to the SLAM system, such as force, acceleration, angular velocity, and/or magnetic field. SLAM technology relies on information obtained from the images and IMU data to achieve, in real-time, localization and mapping at a relatively high position accuracy. Given a set of time-constructive images and IMU data, a SLAM system is typically able to determine its position and orientation at varying points in time. Unfortunately, the accuracy of the position and orientation estimations may vary depending on a variety of factors, such as image content and types of motions the SLAM system experiences. As a result, being able to determine and notify users and/or other system components that the position and orientation accuracy estimation is accurate or has become inaccurate is valuable for computer vision-based technologies.

SUMMARY

In one embodiment, the disclosure provides a method to determine health values from one or more VIO feature measurements. The method receives one or more VIO feature measurements associated with a set of image frames from a VIO system. The VIO feature measurements are based on a VIO system's processing of the image frames to determine position, orientation, or both types of information. The method is able to generate a plurality of feature models to estimate health values for the VIO system. Each feature model includes at least one tunable feature model parameter to determine a plurality of feature health values based for the VIO feature measurements. Afterwards, the method compares the feature health values with ground truth health scores associated with the set of image frames to determine errors between the feature health values and the ground truth health scores. Based on the errors, the method is able to update the feature model parameters for one or more of the feature models.

In another embodiment, the method determines an overall health score for a VIO system. A method in accordance with this approach includes determining a plurality of frame health scores based on one or more feature health values and a frame model, where the frame model includes at least one frame model parameter. The method determines an overall health score for the VIO system based on the frame health scores and a decaying weight model. The decaying weight model includes at least one weight model parameter that weighs the frame health scores. The method then compares the frame health scores and the overall health score with a set of ground truth health scores associated with the image frames that correspond to the feature health scores. After the comparison, the method updates the frame model parameter and the weight model parameter based on the comparison of the frame health scores and the overall health score with the set of ground truth health scores.

In yet another embodiment, the method estimates an overall health value for a VIO system. This approach involves receiving one or more VIO feature measurements associated with a set of image frames from a VIO system and determining a plurality of feature health values with the feature models based on the VIO feature measurements. The method then determines a plurality of frame health scores based on one or more feature health values and a frame model, where the frame model includes at least one frame model parameter. The method determines an overall health score for the VIO system based on the frame health scores and a decaying weight model that weighs the frame health scores. The frame models, the feature models, and the decaying weight model are part of a neural network classifier model.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

This disclosure includes various example embodiments that track and estimate the accuracy of a VIO system. In one or more embodiments, a health-tracking engine is able to track the health of a VIO system using machine learning operations. In a training stage, the health-tracking engine may utilize ground truth health scores to train and account for a variety of VIO feature measurements (e.g., the number of image features tracked) when determining the health of the VIO system. The health-tracking engine could include a neural network classifier that utilizes the ground truth health scores to tune and optimize model parameters. Once the health-tracking engine is operating in an online stage, the engine is able to determine in real-time whether position and orientation computations have become inaccurate for a VIO system. To estimate and quantify the health of the VIO system, the health-tracking engine utilizes the tuned model parameters within a filter-based framework. The benefits for being able to quantify a health score include, but are not limited to, being able to inform users that the VIO system is in an inaccurate state, prompt users to change their behavior regarding the VIO system, and/or inform components of the VIO system of the VIO system's current health to modify computing operations and/or allocation of computing resources.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of detecting motion having the benefit of this disclosure.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

Figure 1:
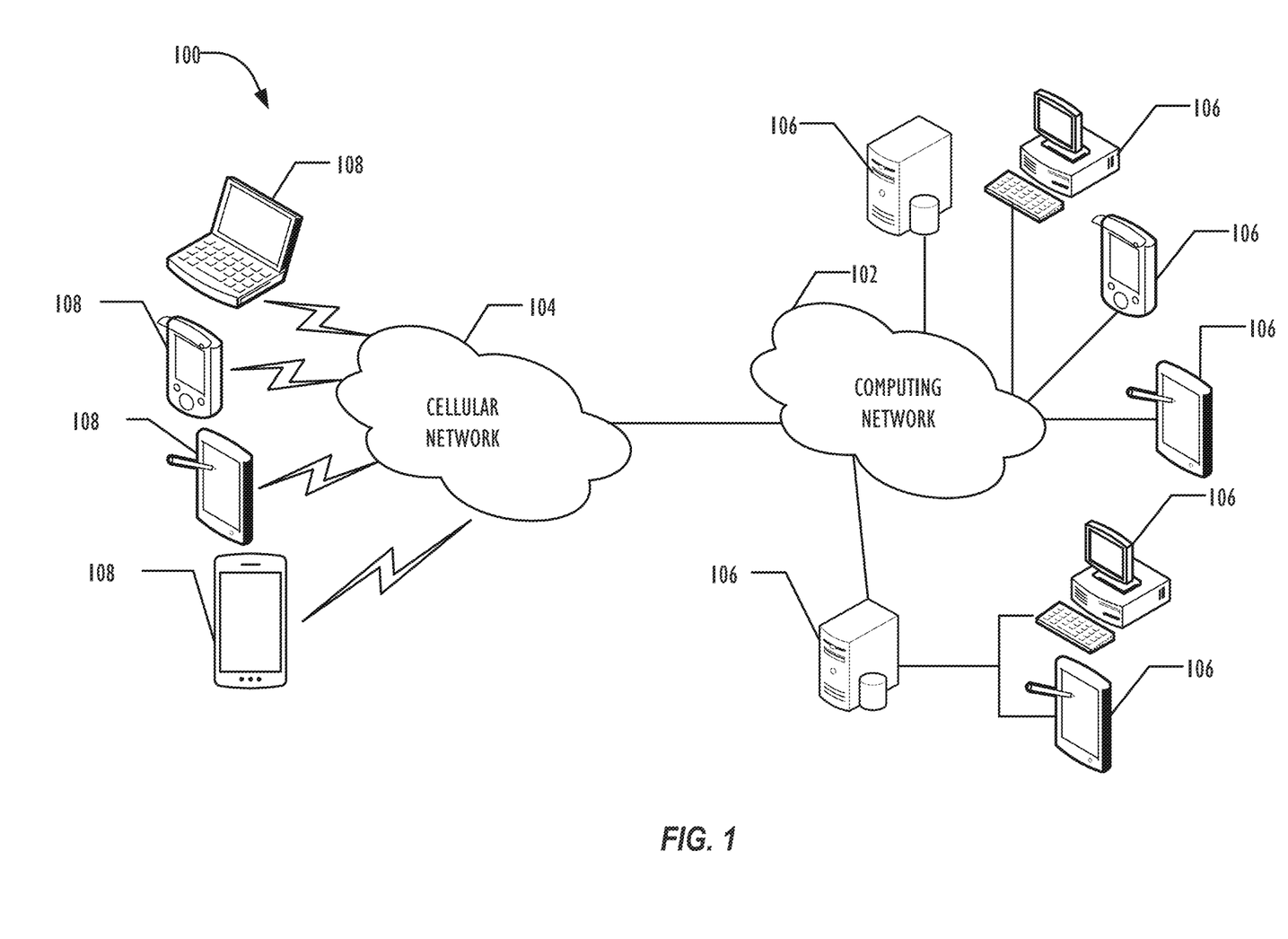
FIG. 1 is a diagram of a communication system wherein embodiments of the present disclosure may operate.

FIG. 1 is a diagram of a communication system 100 wherein embodiments of the present disclosure may operate. FIG. 1 illustrates that the communication system 100 may include a computing network 102 and a cellular network 104 that transports data, such as location and map information. The computing network 102 may include one or more networks that transport data using one or more communication protocols. For example, computing network 102 may include the Internet, enterprise networks, data centers, wide area networks (WANs), radio-based networks (e.g., wireless fidelity (WiFi® (WiFi is a registered trademark owned by Wi-Fi Alliance Corporation)) and Bluetooth® networks (Bluetooth is a registered trademark owned by Bluetooth Sig, Inc.)), and/or local area networks (LANs). Networks within computing network 102 may route data using network protocols that include, but are not limited to, the Internet Protocol (IP), Transmission Control Protocol (TCP), and Ethernet. Computing network 102 may include a variety of computing devices 106, such as computers, servers, hosts, laptops, mobile devices, electronic user devices, robotic systems, and/or any other types of computing devices capable of communicating and transporting data (e.g., location and map information) within computing network 102.

As shown in FIG. 1, the communication system 100 may also include a cellular network 104 that is coupled to the computing network 102. The cellular network 104 may be configured to transport data and provide communication services to multiple mobile communication devices 108 that include, but are not limited to computers, laptops, mobile devices, and/or other electronic devices that are capable of receiving and transmitting data (e.g., location and map information) over a mobile communication network. Generally, the cellular network 104 is capable of supporting communication between two or more mobile communication devices 108 without the devices being physically connected (e.g., wired connection). The cellular networks 104 may also include multiple cellular towers and base stations that provide communication services and transport data between mobile communication devices 108 and/or computing devices 106.

In one embodiment, one or more of the computing devices 106 and/or one or more of the mobile communication devices 108 include a VIO system (e.g., a SLAM system) that tracks and maps position and orientation information and a health-tracking engine that determines and identifies when the computed position and orientation information becomes inaccurate. Rather than having health-tracking engine determine a health value by using the covariance directly received from the VIO system, or based on a state machine that determines the health value by evaluating VIO feature measurements to one or more pre-defined thresholds, a health-tracking engine in accordance with one or more embodiments may perform machine learning operations. To implement machine learning operations, the health-tracking engine could include one or more models configured to implement machine learning operations, such as a 1-dimensional filter (e.g., a Kalman-Filter), a sigmoid model, and/or a neural network classifier based on the 1-dimensional filter and/or the sigmoid model. The health-tracking engine may be trained with ground truth health scores to compute and tune model parameters used for estimating the health of the VIO system. Subsequently, once training of the health-tracking engine is complete, the health-tracking engine may be released online to estimate the overall health of the VIO system.

As used herein, the term "health" refers to the VIO system's ability to accurately determine the position and orientation of a computing system, such as computing devices 106 and/or mobile communication devices 108 at a given point in time. An estimated "good health" reference within this disclosure represents that the computed position and orientation information by the VIO system have a relatively high accuracy at a given point in time, and a "bad health" reference within this disclosure represents that the computed position and orientation information by the VIO system have a relatively low accuracy at a given point in time. Health of a VIO system may vary at different points in time depending on a variety of environmental factors, the types of operations the VIO system is performing, the amount of available and allocated computational resources, and/or the type and quality of image capturing devices, IMUs, sensors, and/or other relevant measuring equipment. Quantifying "bad" or "good" health, utilizing tuned model parameters in a filter-based framework allows a health engine in accordance with this disclosure to continually improve its estimation of the health of the VIO system as opposed to using pre-determined thresholds and/or basing the health value on the VIO system's covariance.

During the training stage, the health-tracking engine receives one or more VIO feature measurements obtained from the VIO system. Non-limiting examples of VIO feature measurements include the number of image features tracked, the percentage of inlier features, and linear and angular velocity of the computing device 106 and/or the mobile communication device 108. The health-tracking engine may estimate the health of the VIO system based on one or more model parameters associated with each of the VIO feature measurements. In one or more embodiments, the model parameters for the health-tracking engine may be initially set to have pre-determined and/or default values. For instance, a user may manually set the model parameters of the health-tracking engine to specific values or the health-tracking engine may automatically be set to the specific values based on a preloaded configuration (e.g., a factory setting).

Once the model parameters are set (e.g., manually or automatically loaded), one or more machine learning operations may then be used to tune and optimize the model parameters during the training stage. During the training stage, the health-tracking engine may estimate the health of the VIO system based a given set of test frames. The health-tracking engine subsequently compares the estimated health results to a generated set of ground truth health scores to determine the error of the estimated health results. The ground truth health scores correspond to the VIO system's actual or known health scores for the given set of test frames. Based on the determined error, the health-tracking engine may update its model parameters to optimize and accurately estimate the VIO system's health. The health-tracking engine may continue to update its model parameters using the given set of test frames and/or other sets of test frames until the computed error between the estimated health results and ground truth health score reaches an appropriate level. In one embodiment, the training may be formulated as a non-linear optimization problem using a trust-region operation, such as Levenberg-Marquardt algorithm. One or more level of errors to stop the training stage may be based on the convergence of the solution, such as magnitude of the gradient or the delta solution magnitude. Stated another way, the error levels correspond to local minimums and are determined from the convergence of the solution obtained from a trust-region operation.

Once training is complete, the trained health-tracking engine may transition to an online stage. The trained health-tracking engine's model parameters may be part of a filter-framework that estimates the overall health of a VIO system. As an example, the model parameters may be part of a trained neural network health classifier, as opposed to using a trained Kalman-filter, because the health classifier's model provides more flexibility and is relatively easier to train. The trained neural network health classifier receives a variety of VIO feature measurements from the VIO system and based on the tuned model parameters, generates an overall health score for the VIO system. In one embodiment, the trained neural network health classifier may include a different sigmoid model for each type of VIO feature measurement. For example, one sigmoid model could estimate a feature health score for VIO feature measurements relating to the percentage of inlier data points of a bundle adjustment operation within the VIO system and another sigmoid model could estimate a second feature health score for VIO feature measurements relating to the short track ratio percentage in a VIO sliding window. Based on the sigmoid models for each type of VIO feature measurement, the neural network health classifier is able to determine a frame health score for one or more of the captured frames. The frame health score associated with each of the captured frames may then be weighted and fused or otherwise combined together to determine the overall health score of the VIO system. In another embodiment, rather than implementing a sigmoid model for each type of VIO feature measurement, the trained health-tracking engine may implement a 1-dimensional filter and then weight each frame's health score to determine the VIO system's overall health score. Other embodiments of the trained neural network health classifier may include other types of filters and/or models used to estimate the health of the VIO system.

Once the health-tracking engine estimates and computes the overall health score, the computing device 106 and/or the mobile communication device 108 may perform a variety of operations to modify the performance and/or behavior of the VIO system. As one example, the health-tracking engine may provide the overall health score to a notification system within the computing device 106 and/or the mobile communication device 108 to notify a user of the current state of the VIO system. In situations where the overall health score indicates "bad health," the notification allows a user to change operations of the computing device 106 and/or the mobile communication device 108 and/or perform certain actions (e.g., maintenance) to improve or correct potential issues. Additionally or alternatively, the VIO system may receive the estimated health score and modify the allocation of computing resources and acquisition of data. For example, when the estimated health score indicates a "bad health," the VIO system may stop adding mapped keyframes. If the estimated health score indicates "good health," the VIO system may save computing resources by using fewer visual features.

Although FIG. 1 illustrates a specific embodiment of a communication system 100, the disclosure is not limited to the specific embodiment illustrated in FIG. 1. For instance, rather than having the VIO system and the health-tracking engine located within a single electronic device (e.g., mobile communication device 108), embodiments of the present disclosure may have the health-tracking engine and the VIO system located on separate devices. In one or more of these embodiments, the health-tracking engine could communicate with the VIO system (e.g., VIO feature measurements) via the computing network 102 and/or cellular network 104. Additionally or alternatively, the health-tracking engine and/or the VIO system may not transmit and/or receive data using computing network 102 or cellular network 104, and instead may communicate using other forms of transmission, such as satellite based communications. The VIO system and/or health-tracking engine may be located within other types of electronic devices not explicitly show in FIG. 1, such as electronic wearable devices and/or medical devices transplanted within a human body. The use and discussion of FIG. 1 is only an example to facilitate ease of description and explanation.

Figure 2:
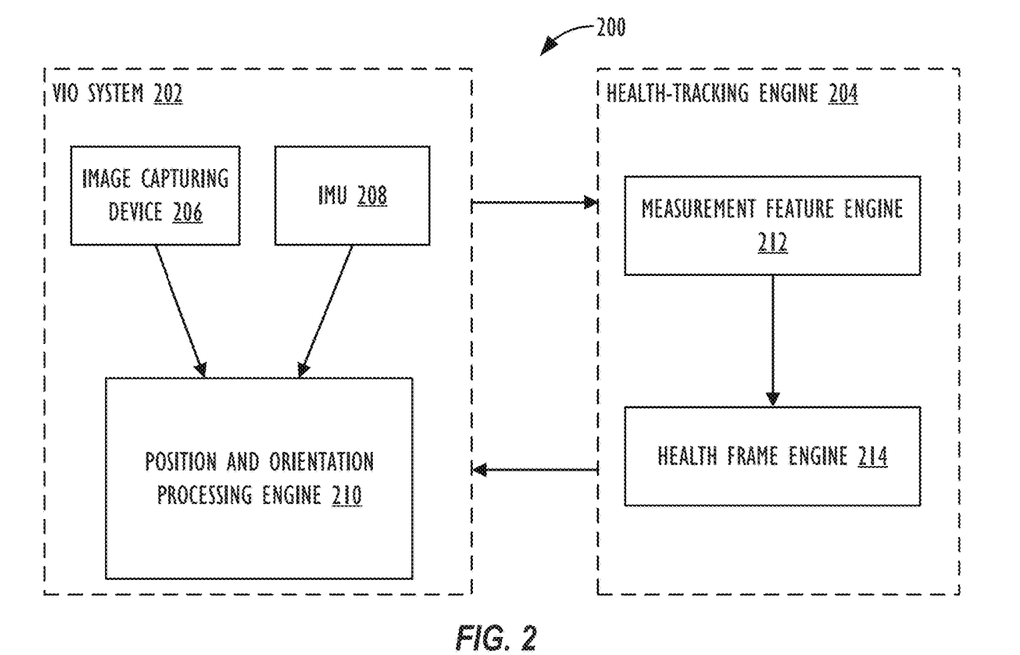
FIG. 2 is a block diagram of a computing system that estimates the health of a VIO system.

FIG. 2 is a block diagram of a computing system 200 that estimates the health of a VIO system 202. Using FIG. 1 as an example, computing system 200 may correspond to one or more of the computing devices 106 and/or one or more of the mobile communication devices 108. As shown in FIG. 2, the computing system 200 includes a VIO system 202 and a health-tracking engine 204. The VIO system 202 may include an image capturing device 206 (e.g., a digital camera) that is able to convert an optical image into an electronic signal. As an example, the image capturing device 206 may utilize a variety of image sensing components, such as a digital charge-coupled device (CCD), a depth sensor, a stereo camera pair, a flash light detection and ranging (LIDAR) sensor, a laser sensor, or any combination of these, to capture images. FIG. 2 also depicts that the VIO system 202 includes an IMU 208 that may include one or more hardware components, such as a gyroscope and/or accelerometer, for recording IMU data of the VIO system 202. In one example, IMU 208 may measure and report on the VIO system's 202 six degrees of freedom (X, Y, and Z Cartesian coordinates, and roll, pitch, and yaw components of the device's angular velocity). IMU 208 may also output other types of IMU data known by persons of ordinary skill in the art for navigation, orientation, and/or position purpose.

In FIG. 2, the VIO system 202 also includes a position and orientation processing engine 210 that receives captured images from the image capturing device 206 and IMU data from the IMU 208 and computes position and orientation information of the VIO system 202. Initially, once the position and orientation processing engine 210 receives the IMU data and captured images, the position and orientation processing engine 210 may perform a variety of pre-processing operations that include, but are not limited to, computing feature tracks, selecting keyframes, and mapping IMU data and feature tracks to the keyframes. An image feature may correspond to the image coordinates (e.g., the x-y coordinates) representing a particular location and/or pixel or a group of pixels indicative of an object or a portion of an object in a frame. The pre-processing operations may generate feature tracks by identifying one or more image features in a first frame and then matching those one or more image features with one or more corresponding image features in consecutive frames. Pre-processing operations may select keyframes, a subset of frames received from the image capturing device 206, based on one or more decision rule operations known in the art. A group of keyframes (i.e., set of images) may be referred to as a window throughout this disclosure. Other pre-processing operations could also include associating feature tracks and IMU readings to one or more keyframes, estimating the initial state of the VIO system 202, estimating the initial position and/or orientation of objects proximate to the VIO system 202, and/or other operations known in the art.

After performing pre-processing operations, the position and orientation processing engine 210 is able to construct a scaled geometric model of the real environment. For instance, the position and orientation processing engine 210 may process data one widow at a time to generate the scaled geometric model. The scaled geometric model may include model variables that represent the position and/or orientation of objects proximate to the VIO system 202. Additionally, the scaled geometric model may include model variables that represent state information of the VIO system 202, such as position, orientation, velocity, and/or inertial biases of the VIO system 202. The position and orientation processing engine 210 may also include an information matrix that contain multiple entries that represent information regarding the model variables, such as confidence information.

Embodiments of the position and orientation processing engine 210 may perform a variety of operations know by persons having ordinary skill in the art to generate and update the scaled geometric model. For instance, the position and orientation processing engine 210 may include a bundle adjustment engine, a sparse structure marginalization (SSM) engine and a delayed motion marginalization (DMM) engine to generate and update the model variables. The bundle adjustment engine maintains and outputs model variables for post-processing operations. The SSM and DMM engines may perform marginalization, for example, that reduces the number of variables associated with an information matrix. In another embodiment, rather than implementing a bundle adjust engine, the position and orientation processing engine 210 may use a Kalman filter to correct inaccurate scale estimates caused by noise and/or other inaccuracies within the IMU readings.

The position and orientation processing engine 210 may also perform post-processing operations that utilize the information contained in the model variables based on one or more user-applications. Stated another way, the post-processing operations can include various algorithms/programs and/or hardware that utilize the information contained in the model variables depending on the user-application. For example, the post-processing operations may include a program that uses the model variables to determine a path history of the VIO system 202 and store the path history in memory. As model variables become updated, the position and orientation processing engine 210 is able to take three dimensional (3D) feature position estimates and device state estimates determined at the time of each keyframe and adds those values to a collection (e.g., an array) of historical position and orientation values for the VIO system 202. The position estimates may then be plotted by the VIO system 202 on a map or other grid to illustrate the path travelled by the device.

As shown in FIG. 2, the VIO system 202 shares one or more VIO feature measurements with the health-tracking engine 204. The health-tracking engine 204 may be implemented using hardware, software, or combinations thereof. Examples of VIO feature measurements that the health-tracking engine 204 may obtain from the VIO system 202 include, but are not limited to, the minimum diagonal element of the acceleration bias information matrix, the minimum diagonal element of the gyro bias information matrix, inlier ratio numbers for the bundle adjustment, the short track ratio number in a VIO sliding window, the small residual ratio number in a VIO sliding window, the bundle adjustment step size, and stationary velocity. Other embodiments of the health-tracking engine 204 may receive other VIO feature measurements that are well-known in the art to track and estimate the health of the VIO system 202. The VIO system 202 may transfer to the health-tracking engine 204 the VIO feature measurements for each window the position and orientation processing engine 210 identifies. In other embodiments, the VIO system 202 may not only transfer the VIO feature measurements for each window, but also other frames not assigned to windows (e.g., non keyframes). After the health-tracking engine 204 receives as input the VIO feature measurements for one or more frames, the health-tracking engine 204 may generate an overall health score for the VIO system 202.

To estimate the overall health score for the VIO system 202, the health-tracking engine 204 can perform one or more machine learning operations, such as utilizing a neural network classifier. For example, the health-tracking engine's 204 neural network classifier may include multiple network layers that define the relationship between the VIO feature measurement inputs and the neural network classifier's one or more outputs (e.g., the overall health score for the VIO system 202). The neural network classifier may be a relatively simple neural network with a few layers or a relatively complicated neural network with numerous layers. Each node located between the VIO feature measurement inputs and the output nodes of the neural network could represent a specific model that computes different health scores and relates the different health scores to each other. Utilizing a neural network classifier, as opposed to a 1-dimensional model or a sigmoid model, to compute an overall health score provides for model flexibility and the capability of building a health-tracking engine 204 that includes higher order relationships.

In FIG. 2, the health-tracking engine 204 can implement a multi-layer neural network classifier. The measurement feature engine 212 within the health-tracking engine 204 acts as the first layer of the neural network classifier. As part of the first layer, the measurement feature engine 212 computes a feature health score for each type of VIO feature measurement that the health-tracking engine 204 receives as an input. State another way, the measurement feature engine 212 could include feature models for each type of VIO feature measurement. In one example, one of the feature models could be an inlier percentage model with one or more feature model parameters that generate a feature health score based on an inlier ratio number for a bundle adjustment engine and another feature model could be a short track model with one or more feature model parameters that generate a feature health score based on a short track ratio number for a VIO sliding window. The feature model parameters may be tuned and optimized with ground truth health scores. Subsequently, once training of the measurement feature engine 212 is complete, the measurement feature engine 212 may be able to compute estimated feature health scores for each type of VIO feature measurement in real-time.

The measurement feature engine 212 could use different types of models to perform the mapping between a VIO feature measurement and a feature health score. In one embodiment, to compute an estimated feature health score for a VIO feature measurement, the measurement feature engine 212 includes a 1-dimensional filter model, such as a Kalman filter, that provides linear mapping to determine "good health" and "bad health" for one of the VIO feature measurement. As an example, the 1-dimensional filter model can be defined as shown in equation 1:

$$z = Hx + \in_z, \in_z \cdot N(0, \sigma_z) \tag{1}$$

In equation 1, the variable "z" represents the estimated feature health score; variable "H" represents the feature model parameter that maps the VIO feature measurement to the estimated feature health score; variable "x" represents the received VIO feature measurement; and variable "$\in_z$" represents noise for the estimated feature health score. As shown in equation 1, the "$\in_z \sim N(0, \sigma_z)$" indicates that variable "$\in_z$" is assumed to be a zero mean Gaussian white noise with covariance of $\sigma_z$. In order to ensure linearity of the model, the VIO feature measurement may be truncated to exclude the non-linear portions of the 1-dimensional filter model (e.g., shown in FIG. 3).

In another embodiment, to compute a feature health score for a VIO feature measurement, rather than using a 1-dimensional filter, the measurement feature engine 212 includes a sigmoid model to fit the mapping between a VIO feature measurement and an estimated feature health score. In one embodiment, the mapping between the VIO feature measurement and feature health score is shown in equation 2:

$$x(t) = \text{sigmoid}(z_i(t)) \tag{2}$$

The sigmoid model can be defined as shown equation 3:

$$x(t) = 1/(1 + \exp(-(w_i z_i(t) + b_i))) \tag{3}$$

In equations 2 and 3, the variable "x(t)" represents the estimated feature health score at time t and variable "$z_i(t)$" represents the received VIO feature measurement at time t. In equation 3, the variables $w_i$ and $b_i$ are feature model parameters that map the VIO feature measurement at time t to the estimated feature health score at time t.

The feature model parameters for each of the feature models may be initially set with pre-determined or default values and subsequently updated using ground truth health scores. In particular, the feature model parameters may be tuned and optimized during the training stage by utilizing one or more sets of test frames that are associated with one or more sets of ground truth health scores. For example, the feature model parameters for each type of VIO feature measurement may be adjusted based on a set of test frames that corresponds to measurement noise, another set of test frames that corresponds to when the VIO system 202 is known to be in "good health," and another set of test frames that correspond to when the VIO system 202 is known to be in bad health. During the training stage, the measurement feature engine 212 may generate the estimated feature health scores for the different set of test frames. In one embodiment, the estimated feature health score may be a fitted health score that averages the feature health scores of keyframes over a prediction window. The fitted health score can be defined as shown in equation 4:

$$\hat{x} = \frac{1}{N} \sum_{t=1}^{N} x(t) \tag{4}$$

In equation 4, the variation "x̂" represents the fitted health score; the variable "N" represents the number of keyframes within the prediction window; and the variable "x(t)" represents the estimated health score at time t. By doing so, the measurement feature engine 212 is able to account for not only the feature health score for the current keyframe, but also the feature health scores from previous keyframes when tuning and optimizing feature model parameters. Other embodiments could use a different number of keyframes (e.g., two keyframes) to estimate the feature health scores for a given a set of test frames. For example, a decaying weight model may be incorporated and become part of the feature model parameters for a given measurement feature. In this example, equation 4 could be modified to use a time-weighted mean, where more recent values within a window are given more weight while other older values within the window are given less weight.

The measurement feature engine 212 then compares the estimated feature health scores for a specific VIO feature measurement to the corresponding set of ground truth health scores to determine the error of the estimated health results. Based on the determined error, the health-tracking engine 204 may update the feature model parameters to improve the estimation of the feature health score. The health-tracking engine may continue to update the feature model parameters using the given sets of test frames and/or other sets of test frames until the computed error between the estimated feature health results and ground truth health score reaches an appropriate level. Updating the feature model parameters may occur using a variety of machine learning operations. In one embodiment, the update of the parameters may be based on the gradient of the cost function, as well as the hessian matrix of the cost function. The updating operation acquires the parameters that minimize the cost function. In this case, the cost function is defined by an average sigmoid function or a simple neural network model.

In FIG. 2, the health-tracking engine 204 includes a health frame engine 214 that estimates a frame health score for the VIO system 202. As the second layer of neural network classifier, the health frame engine 214 may perform operations that utilize the estimated featured scores for a given frame (e.g., a keyframe) or set of frames (e.g., a window) to generate the frame health score. In other words, to generate a frame health score, the health frame engine 214 may include a frame model that considers relevant featured scores as inputs and generates a single frame health score as an output. In one embodiment, the frame model may be a sigmoid model similar to the sigmoid model discussed above for the measurement feature engine 212 that receives the multiple, estimated feature health scores and generates single frame health score for a frame or a set of frames. In another embodiment, the frame model may be a 1-dimensional filter model that utilizes the multiple, estimated feature health scores to generate the single frame health score.

To generate an overall health score, the health frame engine 214 is able to account for not only the current frame health score, but also previous frame scores. To consider multiple frame health scores when generating an overall health score, the health frame engine 214 adds a weight to each frame health score according to a decaying weighted model. Equation 5 provides an example embodiment for a decaying weighted model:

$$y = \frac{1}{N}\sum_{t=1}^{N} wx(t) \tag{5}$$

The weight parameter "w" can be defined as shown equation 6:

$$y = \frac{1}{N}\sum_{t=1}^{N} \exp^{-\alpha t} x(t) \tag{6}$$

In equation 5, variable "y" represents the overall health score and x(t) represents the frame health score at a point in time "t." The weight parameter "w" corresponds to the weight factor assigned based on the decaying weight model. Equation 6 is an embodiment of the decaying weight model, which can be represented as "$\exp^{-\alpha t}$" where the "α" represents a weight model parameter optimized during the training stage. As shown in equation 6, more weight is given to current or more recent frame health scores and less weight is given to older frame health scores. Other embodiments of the health frame engine 214 could use other decaying weight models that determine the weights differently from equation 6 when computing the overall health score.

Similar to the measurement feature engine 212, model parameters for the health frame engine 214 may be trained using ground truth health scores. For example, the health frame engine 214 may update and tune the frame model parameters for the two-layer models (e.g., sigmoid models) and the weight model parameters for the decaying weight model during the training stage. The frame model parameters and the weight model parameters may be adjusted and tuned based on one or more given set of test frames. During the training stage, the health frame engine 214 may generate the estimated frame health scores and the estimated overall health score and compare the scores with their corresponding ground truth scores to determine an error. Based on the determined error, the health frame engine 214 may update and tune the frame model parameters and the weight model parameters to optimize and accurately estimate the feature health score. The health-tracking engine 204 may continue to update the different model parameters using the given sets of test frames and/or other sets of test frames until the computed error reaches an appropriate level.

Once the health frame engine 214 estimates and computes an overall health score, the health frame engine 214 may send the overall health score to a notification system (not shown in FIG. 2) and/or back to the VIO system 202. Providing the overall health score may allow the computing system 200 to perform a variety of operations to modify the performance and/or behavior of the VIO system 202. As one example, the health frame engine 214 may provide the overall health score to a notification system to notify a user the current state of the VIO system 202. In situations where the overall health score indicates a "bad health" for the VIO system 202, the notification allows a user to change operation of the VIO system 202 and/or perform certain actions to improve or correct any potential issues relating to the VIO system 202. Additionally or alternatively, the VIO system 202 may receive the estimated overall health score and modify the allocation of computing resources and acquisition of data. For example, when the estimated overall health score indicates a "bad health," the VIO system 202 may stop adding mapped keyframes in determining position and orientation information. If the estimated health score indicates a "good health," the VIO system 202 may save computing resources, such as using fewer visual features, for determining position and orientation information. Although FIG. 2 illustrates that the health frame engine 214 generates and sends a single overall health score to the notification system and/or the VIO system 202, other embodiments of the health frame engine 214 could generate and send multiple overall health scores as outputs.

Figure 3:
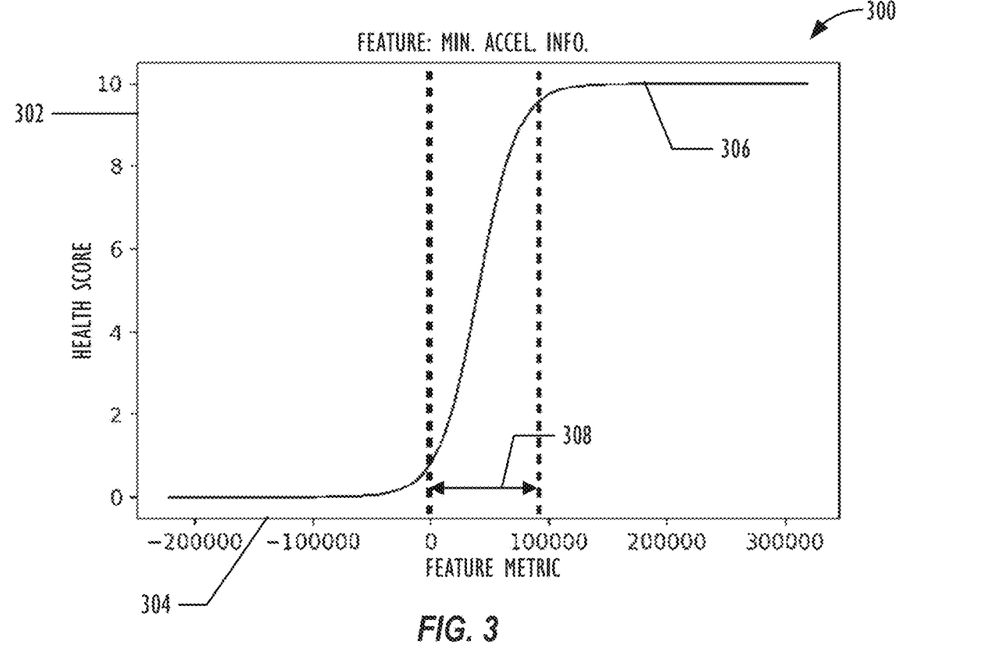
FIG. 3 is an illustrative graph of a 1-dimensional model that maps one type of VIO feature measurement to a feature health score.

FIG. 3 is a graph 300 of a 1-dimensional model that maps a one type of VIO feature measurement to a feature health score. In relation to FIG. 2, graph 300 could correspond to one of the feature models that the measurement feature engine 212 utilizes in computing a feature health score. As shown in FIG. 3, the graph 300 includes a y-axis 302 that represents the estimated feature health score and an x-axis 304 that represents the specific type of VIO feature measurement (e.g., minimum acceleration information). The curve 306 represents the feature model that maps the VIO feature measurement to the estimated feature health score. FIG. 3 shows that the curve 306 can be truncated to only include region 308 to allow for linearity of the model and exclude the non-linear portions of the curve 306. Region 308 may then be used to estimate feature health scores for VIO feature measurements that the health-tracking engine receives from a VIO system. In embodiments where the health-tracking engine is a neural network classifier, the neural network classifier could include a similar 1-dimensional models as shown in FIG. 3 at one or more of the network layers. Each type of VIO feature measurement may have a similar 1-dimensional model to map received measurements into health value scores.

Figure 4:
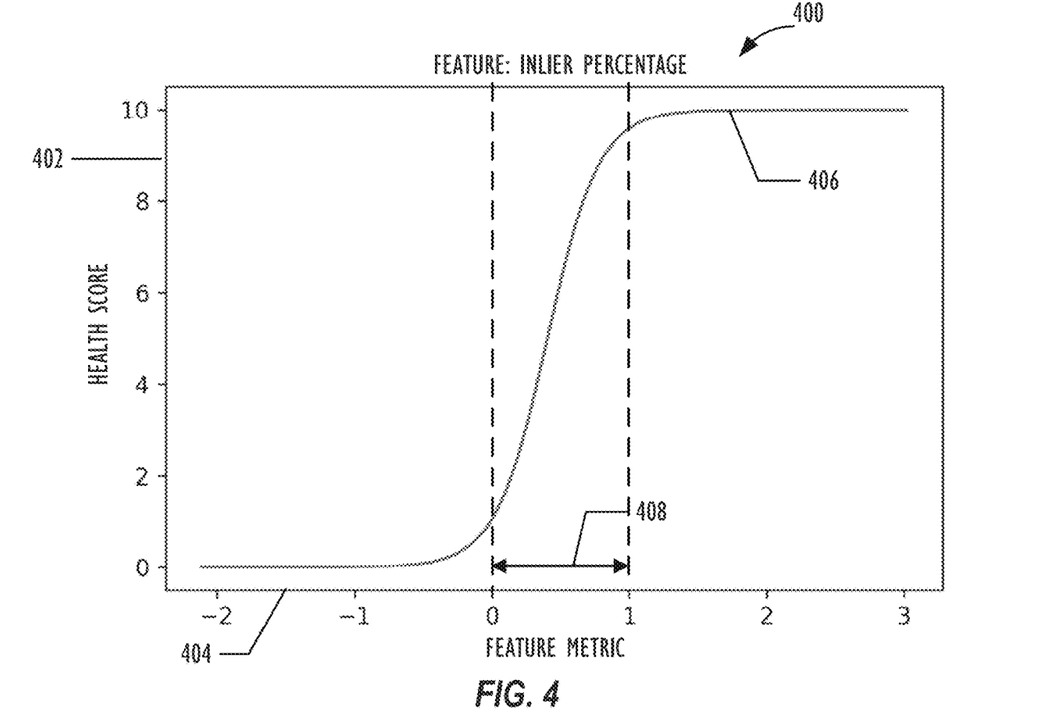
FIG. 4 is an illustrative graph of a sigmoid model for mapping one type of VIO feature measurement to a feature health score.

FIG. 4 is a graph 400 of a sigmoid model for mapping one type of VIO feature measurement to a feature health score. Similar to graph 300, graph 400 could also correspond to one of the feature models that the measurement feature engine 212 may utilize in computing a feature health score. FIG. 4 illustrates that the graph 400 includes a y-axis 402 that represents the estimated feature health score and an x-axis 404 that represents the specific type of VIO feature measurement (e.g., inlier percentage). The curve 406 represents the feature model for mapping the VIO feature measurement to the estimated feature health score. The health area may correspond to region 408, which estimates feature health scores for VIO feature measurements that the health-tracking engine receives from a VIO system. In embodiments where the health-tracking engine 204 is a neural network classifier, the neural network classifier could include similar sigmoid models as shown in FIG. 4 at one or more network layers.

Figure 5:
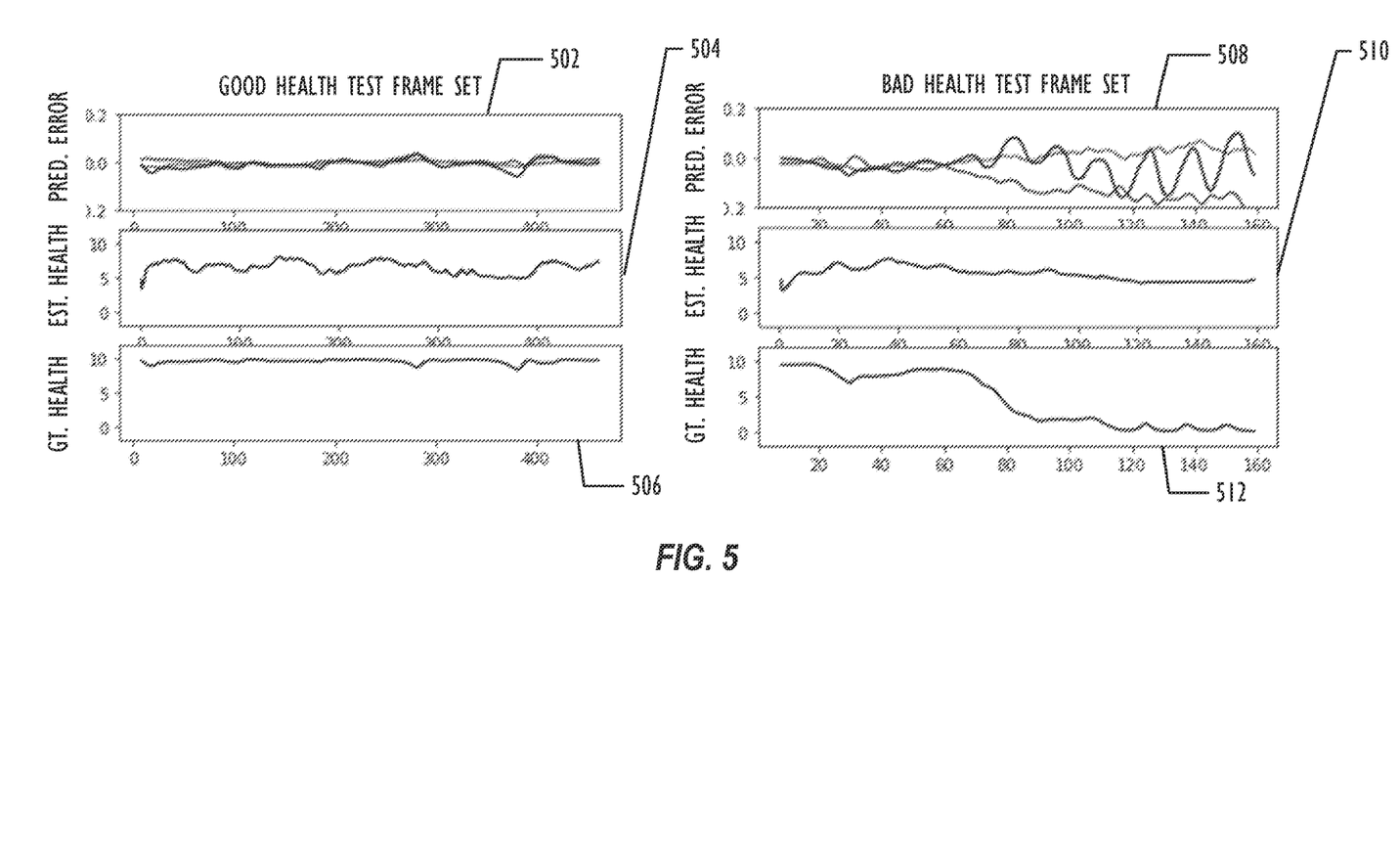
FIG. 5 is a diagram involving error comparison analysis between an estimated health score and ground truth health score for a set of "good health" test frames and a set of "bad health" test frame.

FIG. 5 is a diagram involving error comparison analysis between the estimated health score and ground truth health score for a set of "good health" test frames and a set of "bad health" test frames. Specifically in FIG. 5, charts 502, 504, and 506 correspond to "good health" test frames and charts 508, 510, and 512 are for "bad health" test frames. Charts 506 and 512 represent the good truth health scores for the "good health" test frames and "bad health" test frames, respectively; charts 504 and 510 represent the estimated health score for the "good health" test frames and "bad health" test frames, respectively; chart 502 represents the error between the scores from charts 504 and 506; and chart 508 represents the error between the scores from charts 510 and 512. In one embodiment, the error between the estimated health score and the ground truth health scores is shown below in equation 7.

$$\text{error} = w(y_{GT}) * (y_{GT} - y_{EST})^2 \quad (7)$$

In equation 7, variable "$y_{GT}$" represents the ground truth health score and "$y_{EST}$" represents the estimated health score. The weight parameter "w" corresponds to a weight factor, which may correspond to a lookup table that is proportional to the inverse of the data point with the label. The weight parameter "w" allows for balancing the uneven distribution of the ground truth health score. For example, the weight parameter "w" prevents the training result from biasing to a "good health" score in situations where most of ground-truth health is indicative of "good health." As shown in FIG. 5, chart 508 illustrates that there is significant error between the estimated health score and the ground truth health score as the health of the VIO system worsens. Based on this error, the model parameters may be optimized to improve the detection of when a VIO system has "bad health."

Figure 6:
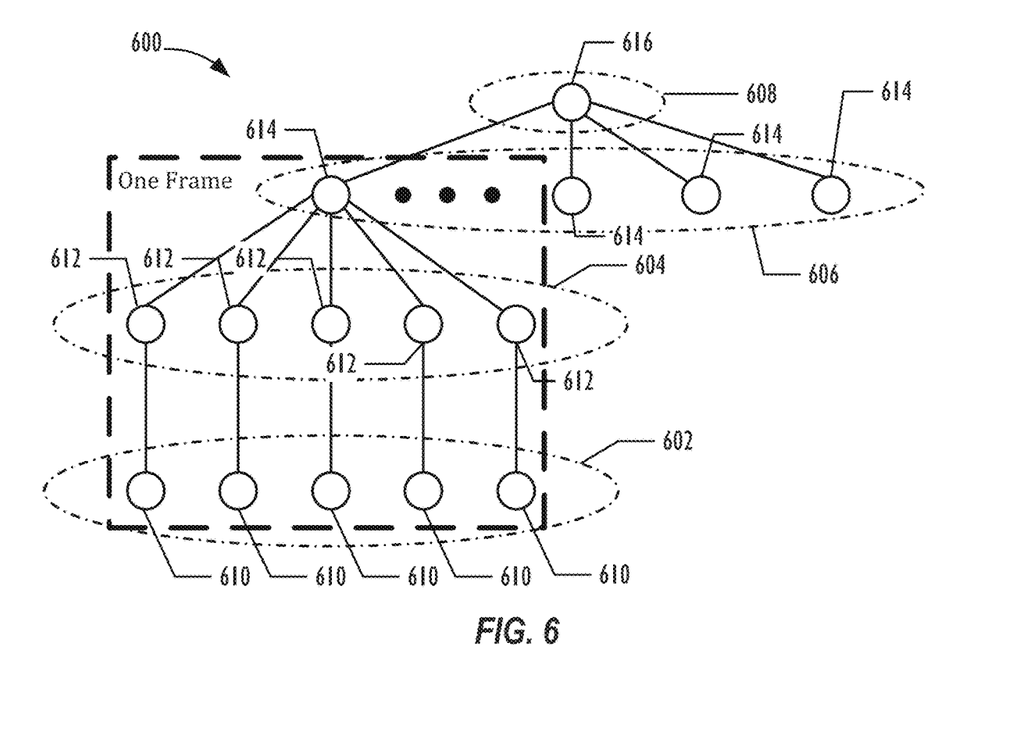
FIG. 6 illustrates an embodiment of a multi-layer neural network classifier.

FIG. 6 illustrates an embodiment of a multi-layer neural network classifier 600. Using FIG. 2 as an example, the health-tracking engine 204 could determine an overall health score by implementing the multi-layer neural network classifier 600. FIG. 6 illustrates that the nodes 610 within the input layer 602 represent the different types of VIO feature measurements, such as an inlier ratio number for a bundle adjustment and a short track ratio number for a VIO sliding window. Each of the nodes 610 may be connected to a corresponding first layer node 612 located within a first layer 604 of the multi-layer neural network classifier 600. The first layer node 612 represents a feature model, such as a 1-dimensional filter or a sigmoid model as described in FIG. 2 that maps a VIO feature measurement input to a feature health score. The first layer nodes 612 are then connected to a second layer node 614 in a second layer 606 of the multi-layer neural network classifier 600. FIG. 1 illustrates the input layer 602 and first layer 604 for one of the frames. Although not specifically illustrated, other frames associated with other second layer nodes 614 could also have their own input layer 602 and first layer 604.

Second layer nodes 614 represent a frame model that generates a frame health score. In one embodiment, the second layer node 614 generates a frame health score for a single frame (e.g., a keyframe) based on the associated feature health scores generated for each of the VIO feature measurement inputs. In other words, the multi-layer neural network classifier 600 may group feature health scores for a specific frame and generate a frame health score for the frame at the second layer node 614. Other embodiments of the multi-layer neural network classifier 600 could have the second layer node 614 generate a frame health score for multiple frames (e.g., a window). In this embodiment, each feature health score that the second layer node 614 receives as input could represent a fitted health score (e.g., the fitted health score shown in equation 4). As discussed in FIG. 2, examples of a frame model could include, but are not limited to, a 1-dimensional filter or a sigmoid model.

The second layer nodes 614 in the second layer 606 could then be connected to one or more output nodes 616 within the output layer 608. In FIG. 6, the multi-layer neural network classifier 600 can produce an output node 616 that represents an overall health score for a VIO system. Recall that as discussed in FIG. 2, the overall health score can be determined by weighting each of the frame health scores according to a decaying weighted model. In one embodiment, the weight parameter may defined as shown in equation 6, where more recent frames have a relatively larger weight factor than frames that are older in time. Although FIG. 6 illustrates that the output layer 608 includes a single output node 616, other embodiments could include multiple output nodes 616.

Figure 7:
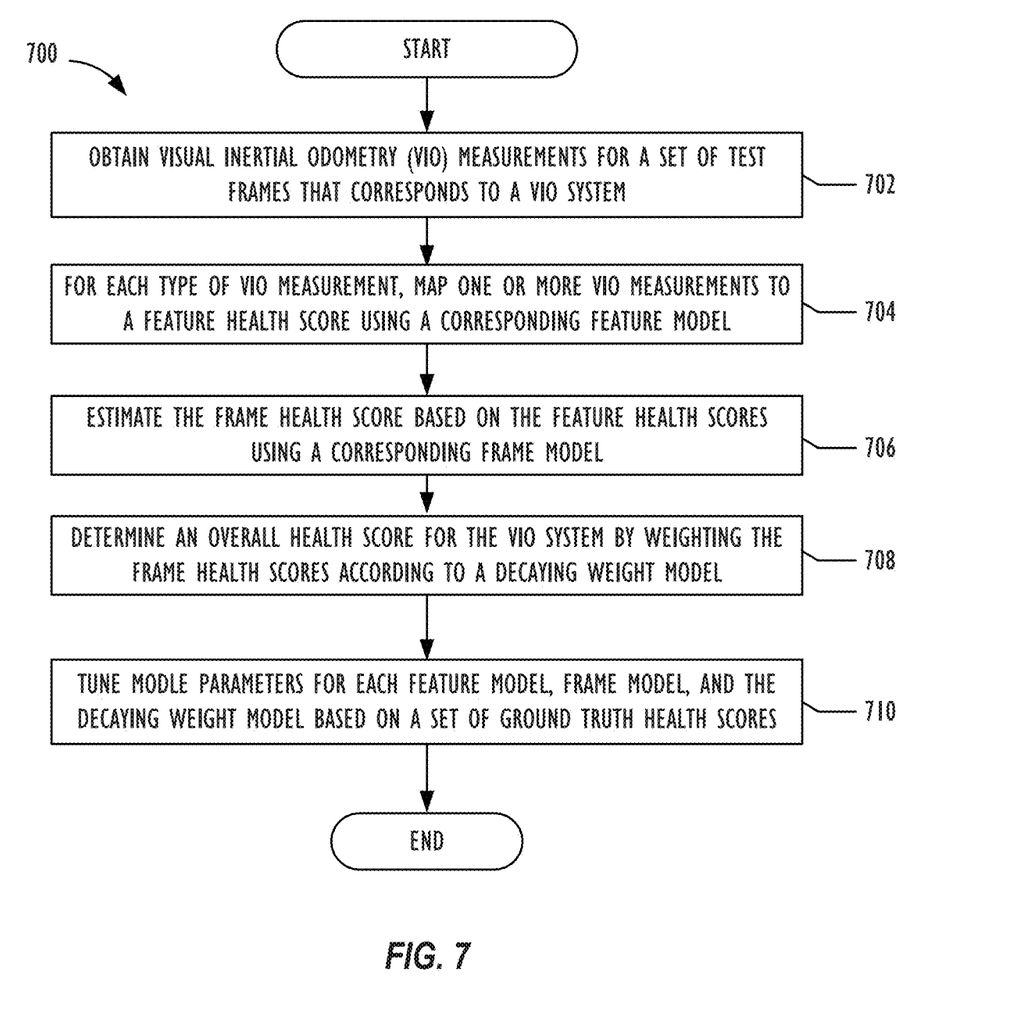
FIG. 7 depicts a flowchart illustrating an operation for estimating the health of a VIO system in accordance with one or more embodiments.

FIG. 7 depicts a flowchart illustrating an operation 700 for estimating the health of a VIO system. In one embodiment, operation 700 may be implemented within the computing system 200 and/or health-tracking engine 204 shown in FIG. 2. Although FIG. 7 illustrates that the blocks within operation 700 are implemented in a sequential order, operation 700 is not limited to this sequential order. For instance, one or more of the blocks, such as blocks 706 and 710, could be implemented in parallel operations. The use and discussion of FIG. 7 is only an example to facilitate explanation and is not intended to limit the disclosure to this specific example.

Operation 700 may start at block 702 and obtain VIO feature measurements for a set of test frames that corresponds with a VIO system. In one embodiment, operation 700 may receive the VIO feature measurements one window at a time. Examples of VIO feature measurements operation 700 may obtain from a VIO system include, but are not limited to, the minimum diagonal element of the acceleration bias information matrix, the minimum diagonal element of the gyro bias information matrix, inlier ratio numbers for the bundle adjustment, the short track ratio number in a VIO sliding window, the small residual ratio number in a VIO sliding window, the bundle adjustment step size, and stationary velocity. Operation 700 may then move to block 704.

At block 704, for each type of VIO measurement, operation 700 may map one or more VIO measurements to a feature health score using a corresponding feature model. In one embodiment, the feature model may be a 1-dimensional filter model, such as a Kalman filter as described by equation 1 that provides a linear mapping to determine the feature health score. In another embodiment, the feature model may be a sigmoid model (e.g., described in equations 2 and 3) to fit the mapping between the VIO feature. The feature health score may be for a single test frame or for a set of test frames (e.g., a window).

Afterwards, operation 700 moves to block 706 to estimate the frame health score based on the feature health scores using a corresponding frame model. Similar to block 704, operation 700 may estimate the frame health score using a 1-dimensional filter model or a sigmoid model. The frame model may receive one or more feature health scores as input to determine the frame health score. In one embodiment, the frame health score could be for a single test frame while in another embodiment the frame health score could be for multiple test frames. Operation 700 may then move to block 708 to determine an overall health score for the VIO system by weighting the frame health scores according to a decaying weight model. In one embodiment, the weighting parameter may be defined as shown by equation 6.

Operation 700 may continue to block 710 and tune model parameters for each of feature model, frame model, and the decaying weight model based on a set of ground truth health scores associated with the set of test frames. Recall that the estimated health scores (e.g., feature health scores, frame health scores, and overall health score) can be compared with a set of ground truth health scores for a range of frames (e.g., 10 seconds worth of frames) to determine the error values. Based on the error values, operation 700 may then tune applicable model parameters to correct and optimize the different models. Operation 700 may be able to re-tune and/or update the model parameters using the same set of test frames and/or another set of test frames.

Figure 8:
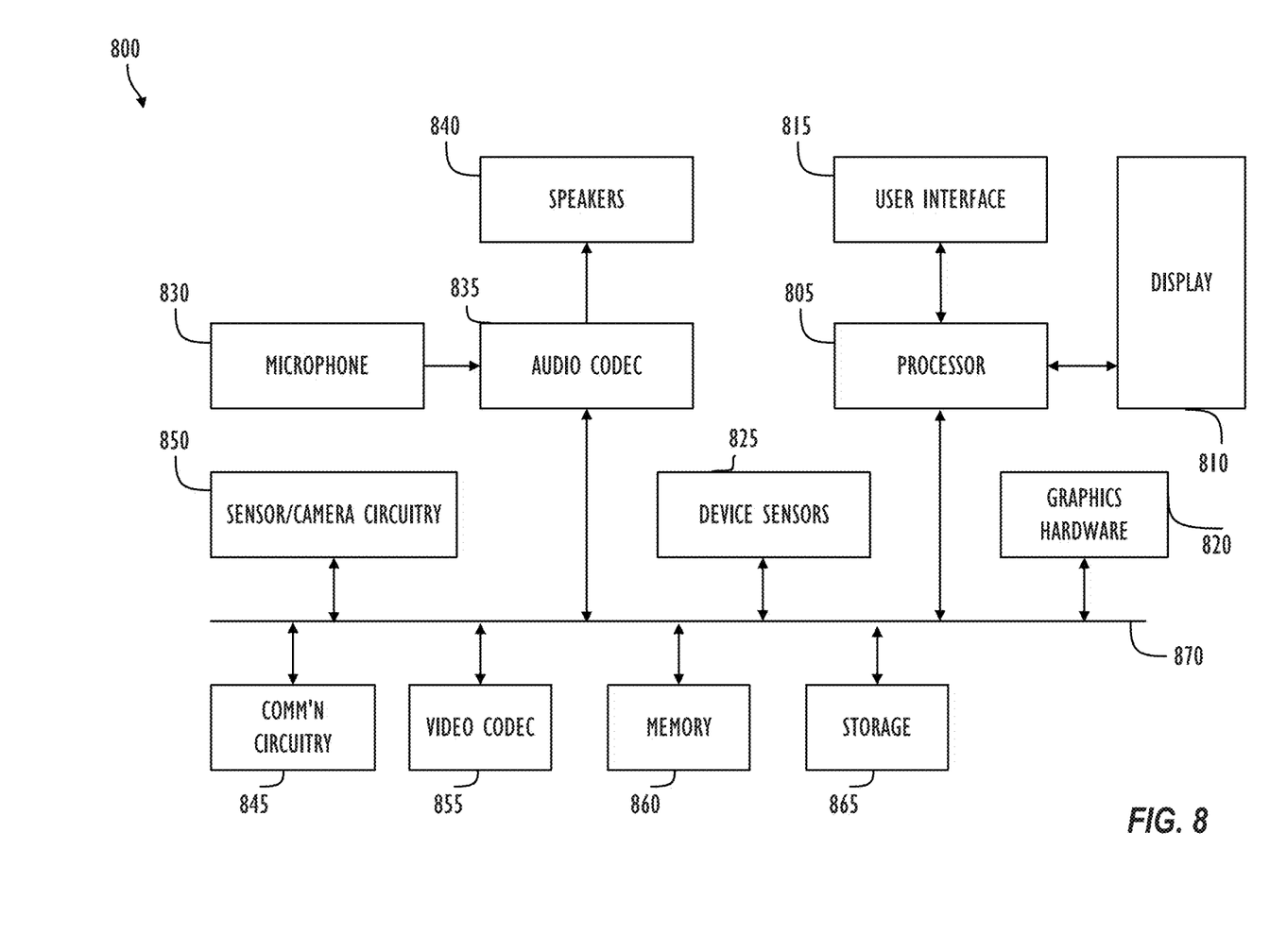
FIG. 8 is a simplified functional block diagram of an illustrative multi-functional electronic device.

Processor 805 may execute instructions necessary to carry out or control the operation of many functions performed by a multi-functional electronic device 800 (e.g., such as model training). Processor 805 may, for instance, drive display 810 and receive user input from user interface 815. User interface 815 can take a variety of forms, such as a button, keypad, dial, a click wheel, keyboard, display screen and/or a touch screen. Processor 805 may be a system-on-chip such as those found in mobile devices and include a dedicated graphics-processing unit (GPU). Processor 805 may represent multiple central processing units (CPUs) and may be based on reduced instruction-set computer (RISC) or complex instruction-set computer (CISC) architectures or any other suitable architecture and each may include one or more processing cores. Graphics hardware 820 may be special purpose computational hardware for processing graphics and/or assisting processor 805 process graphics information. In one embodiment, graphics hardware 820 may include one or more programmable graphics-processing unit (GPU), where each such unit has multiple cores.

Sensor and camera circuitry 850 may capture still and video images that may be processed to generate images in accordance with this disclosure. Sensor in sensor and camera circuitry 850 may capture raw image data as red, green, and blue (RGB) data that is processed to generate an image. Output from camera circuitry 850 may be processed, at least in part, by video codec(s) 855 and/or processor 805 and/or graphics hardware 820, and/or a dedicated image-processing unit incorporated within camera circuitry 850. Images so captured may be stored in memory 860 and/or storage 865. Memory 860 may include one or more different types of media used by processor 805, graphics hardware 820, and camera circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as compact disc-ROMs (CD-ROMs) and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

As used herein, the term "computing system" refers to a single electronic computing device or to two or more electronic computing devices working together to perform the function described as being performed on or by the computing system. This includes, by way of example, a single computer, laptop, host, wearable electronic device, and/or mobile device (e.g., smartphone, tablet, and/or other smart device).

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). For example, while FIG. 2 have been described in context of obtaining position and orientation information for a VIO system, this is not necessary. In addition, some of the described operations may have their individual steps performed in an order different from, or in conjunction with other steps, that presented herein. More generally, if there is hardware support some operations described in conjunction with FIGS. 2 and 7 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by one or more programmable control devices and comprising instructions stored thereon to cause the one or more programmable control devices to:
   receive one or more visual inertial odometry (VIO) feature measurements associated with each image frame of a set of test image frames from a VIO system, wherein the VIO feature measurements each correspond to a measurement of features detected by the VIO system in processing the set of test image frames to determine location information for the VIO system;
   generate a plurality of feature models of a neural network classifier model to estimate health values for the VIO system for a particular feature measurement of the one or more VIO feature measurements, wherein each feature model includes at least one feature model parameter;
   determine a plurality of feature health values with the feature models based on the one or more VIO feature measurements, wherein each of the plurality of feature health values correspond to an accuracy of a corresponding feature measurement associated with the feature model;
   compare the feature health values with ground truth health scores associated with the set of test image frames to determine one or more errors between the feature health values and the ground truth health scores, wherein the ground truth health scores comprise a set of predetermined health scores corresponding to the VIO system and the set of test image frames; and
   update the feature model parameters for one or more of the feature models based on the one or more errors.

2. The non-transitory program storage device of claim 1, wherein the instructions further cause the one or more programmable control devices to:
   determine a plurality of frame health scores based on one or more feature health values and a frame model, wherein the frame model includes at least one frame model parameter;
   determine an overall health score for the VIO system based on the frame health scores and a decaying weight model, wherein the decaying weight model includes at least one weight model parameter that weights the frame health scores;
   compare the frame health scores and the overall health score with a second set of ground truth health scores associated with the set of test image frames; and
   update the frame model parameter and the weight model parameter based on the comparison of the frame health scores and the overall health score with the second set of ground truth health scores.

3. The non-transitory program storage device of claim 2, wherein each frame health score corresponds to one image frame within the set of test image frames.

4. The non-transitory program storage device of claim 2, wherein the at least one weight model parameter is configured to provide a greater weight value for images frames within the set of test image frames that are relatively more current and provides a smaller weight value for image frames within the set of test image frames that are relatively older.

5. The non-transitory program storage device of claim 2, wherein each frame health score corresponds to at least some image frames within the set of test image frames.

6. The non-transitory program storage device of claim 2, wherein the frame model, the feature models, and the decaying weight model are part of the neural network classifier model.

7. The non-transitory program storage device of claim 6, wherein the neural network classifier model is a two-layer classifier model.

8. The non-transitory program storage device of claim 1, wherein the feature models are sigmoid models.

9. The non-transitory program storage device of claim 1, wherein the feature models are 1-dimensional filters.

10. A system comprising:
    an image capture device;
    memory; and
    one or more programmable control devices operable to interact with the image capture device and the memory, and to perform operations comprising:
      receiving one or more visual inertial odometry (VIO) feature measurements associated with each image frame of a set of test image frames from a VIO system, wherein the VIO feature measurements each correspond to a measurement of features detected by the VIO system in processing the set of test image frames to determine location information for the VIO system;
      generating a plurality of feature models of a neural network classifier model to estimate health values for the VIO system for a particular feature measurement of the one or more VIO feature measurements, wherein each feature model includes at least one feature model parameter;
      determining a plurality of feature health values with the feature models based on the one or more VIO feature measurements, wherein each of the plurality of feature health values correspond to an accuracy of a corresponding feature measurement associated with the feature model;
      comparing the feature health values with ground truth health scores associated with the set of test image frames to determine one or more errors between the feature health values and the ground truth health scores, wherein the ground truth health scores comprise a set of predetermined health scores corresponding to the VIO system and the set of test image frames; and updating the feature model parameters for one or more of the feature model based on the one or more errors.

11. The system of claim 10, wherein the one or more programmable control devices further performs operations comprising:

determining a plurality of frame health scores based on one or more feature health values and a frame model, wherein the frame model includes at least one frame model parameter;

determining an overall health score for the VIO system based on the frame health scores and a decaying weight model, wherein the decaying weight model includes at least one weight model parameter that weights the frame health scores;

comparing the frame health scores and the overall health score with a second set of ground truth health scores associated with the set of test image frames; and updating the frame model parameter and the weight model parameter based on the comparison of the frame health scores and the overall health score with the second set of ground truth health scores.

12. The system of claim 11, wherein the at least one weight model parameter is configured to provide a greater weight value for images frames within the set of test image frames that are relatively more current and provides a smaller weight value for image frames within the set of test image frames that are relatively older.

13. The system of claim 11, wherein the frame model, the feature models, and the decaying weight model are part of the neural network classifier model.

14. The system of claim 13, wherein the neural network classifier model is a two-layer classifier model.

15. The system of claim 11, wherein each frame health score corresponds to one image frame within the set of test image frames.

16. The system of claim 10, wherein the feature models are sigmoid models.

17. A method comprising:

receiving one or more visual inertial odometry (VIO) feature measurements associated with each image frame of a set of test image frames from a VIO system, wherein the VIO feature measurements each correspond to a measurement of features detected by the VIO system in processing the set of test image frames to determine location information for the VIO system;

generating, by an electronic device, a plurality of feature models of a neural network classifier model to estimate health values for the VIO system for a particular feature measurement of the one or more VIO feature measurements, wherein each feature model includes at least one feature model parameter;

determining a plurality of feature health values with the feature models based on the one or more VIO feature measurements, wherein each of the plurality of feature health values correspond to an accuracy of a corresponding feature measurement associated with the feature model;

comparing the feature health values with ground truth health scores associated with the set of test image frames to determine one or more errors between the feature health values and the ground truth health scores, wherein the ground truth health scores comprise a set of predetermined health scores corresponding to the VIO system and the set of test image frames; and updating the feature model parameters for one or more of the feature model based on the one or more errors.

18. The method of claim 17, further comprising:

determining, using the electronic device, a plurality of frame health scores based on one or more feature health values and a frame model, wherein the frame model includes at least one frame model parameter;

determining, using the electronic device, an overall health score for the VIO system based on the frame health scores and a decaying weight model, wherein the decaying weight model includes at least one weight model parameter that weights the frame health scores;

comparing, using the electronic device, the frame health scores and the overall health score with a second set of ground truth health scores associated with the set of test image frames; and updating, using the electronic device, the frame model parameter and the weight model parameter based on the comparison of the frame health scores and the overall health score with the second set of ground truth health scores.

19. The method of claim 18, wherein each frame health score corresponds to at least some image frames within the set of test image frames.

20. The method of claim 17, wherein the feature models are 1-dimensional filters.

* * * * *